US00RE33929E

United States Patent [19]

Diener

[11] E Patent Number: Re. 33,929

[45] Reissued Date of Patent: May 19, 1992

[54] CENTRAL INJECTION DEVICE FOR INTERNAL COMBUSTION ENGINES

[75] Inventor: Rudolph Diener, Zurich, Switzerland

[73] Assignee: Kwik Products International Corporation, Vancouver, Canada

[21] Appl. No.: 195,350

[22] Filed: May 12, 1988

Related U.S. Patent Documents

Reissue of:

[64] Patent No.: 4,474,712
Issued: Oct. 2, 1984
Appl. No.: 426,648
Filed: Sep. 29, 1982

U.S. Applications:

[63] Continuation of Ser. No. 906,339, Sep. 11, 1986, abandoned.

[30] Foreign Application Priority Data

May 28, 1982 [CH] Switzerland ..... 426648

[51] Int. Cl.[5] ..... F02M 29/02
[52] U.S. Cl. ..... 261/88
[58] Field of Search ..... 261/88

[56] References Cited

U.S. PATENT DOCUMENTS

| | | | |
|---|---|---|---|
| Re. 89,060 | 12/1976 | Reddy | 123/32 |
| 791,801 | 6/1905 | Leinau | 261/89 |
| 957,976 | 5/1910 | Lucas | 261/88 |
| 1,061,995 | 5/1913 | Erickson | 261/89 |
| 1,092,079 | 3/1914 | Reeder | 261/89 |
| 1,106,258 | 8/1914 | Tucker et al. | 261/88 |
| 1,120,763 | 12/1914 | Thomas | 261/62 |
| 1,153,077 | 9/1915 | Hippel | 261/88 |
| 1,174,529 | 3/1916 | Sykes | 261/92 |
| 1,283,294 | 10/1918 | Porter | 261/88 |
| 1,303,761 | 5/1919 | Bouteille | 261/DIG. 61 |
| 1,360,445 | 11/1920 | Rollins | 261/52 |

(List continued on next page.)

FOREIGN PATENT DOCUMENTS

| | | | |
|---|---|---|---|
| 749179 | 7/1933 | France | 261/88 |
| 606784 | 11/1978 | Switzerland . | |
| 191633 | 1/1923 | United Kingdom . | |
| 827861 | 10/1960 | United Kingdom | 261/88 |

*Primary Examiner*—Tim Miles
*Attorney, Agent, or Firm*—Hubbard, Thurman, Tucker & Harris

[57] ABSTRACT

The annulus (20) around the fuel feed stud (8) which seals the rotor (14) of this central injection device is connected to a stowage compartment (40) for intake air by way of a ball bearing (7). In the case of the impeller (31, 35) driven rotor (14), the stowage air pressure counteracts the leakage fuel pressure in the annulus (20). By [adapting] *adopting* the width of the opening of the stowage compartment (40), the stowage air pressure is adjusted to be equal to or slightly higher than the leakage fuel pressure, so that no fuel can flow out of the annulus (20). [To enrich the fuel of the air-fuel mixture in the higher load range, a width of opening of the stowage compartment (40) is provided where the stowage air pressure at the corresponding RPM's becomes smaller than the leakage fuel pressure and the rotor (14) delivers additional fuel. ] A ventilating passage (42) connects the stowage compartment (40) with the annulus (33) which conducts the fuel discharged from the fuel outlet opening (16) to the spray ring (35) below the blades (38). [This ventilation ensures an undisturbed fuel delivery into the annulus (33). This injection device produces an air-fuel mixture in which the toxic constituents in the exhaust lie uniformly below the limit values and there are no high peak values for the toxic constituents.] *When the rotor (14) is at rest, an internal fuel level "N" is established therein. During ingested air-driven rotation of the rotor, fuel is sequentially flowed through the fuel feed stud (8) downward across the at-rest fuel level, laterally through the rotor via an internal passage portion (17c) therein, upwardly through the rotor, via an internal passage portion (17d) therein, across the fuel level, and then outwardly through a lateral fuel outlet opening (16) into a concentric annulus (33). The fuel then flows downward through the annulus (33) to the spray ring (35) below the blades (38).*

20 Claims, 2 Drawing Sheets

U.S PATENT DOCUMENTS

| | | | |
|---|---|---|---|
| 1,439,573 | 12/1922 | Orem | 261/89 |
| 1,529,612 | 3/1925 | Assmus | 261/92 |
| 1,597,072 | 8/1936 | Henkle | 261/89 |
| 1,636,187 | 7/1927 | Kessel | 261/89 |
| 1,730,410 | 10/1929 | Dennison | 261/89 |
| 1,746,439 | 2/1930 | Murner | 261/89 |
| 1,767,305 | 6/1930 | Musall | 261/89 |
| 2,119,922 | 6/1938 | Lutz | 261/84 |
| 2,188,189 | 1/1940 | Miller, Jr. | 261/89 |
| 2,197,647 | 4/1940 | Lorenzen | 261/88 |
| 2,211,552 | 8/1940 | Bernstein et al. | 261/89 |
| 2,223,836 | 12/1940 | Snyder | 261/88 |
| 2,665,892 | 1/1954 | Rumpler | 261/89 |
| 2,668,698 | 2/1954 | Rollins | 261/41 |
| 2,759,718 | 8/1956 | Gideon | 261/65 |
| 2,791,409 | 5/1957 | Lauder | 261/88 |
| 2,823,906 | 2/1958 | Gideon | 261/56 |
| 2,998,230 | 8/1961 | Perretti | 261/88 |
| 3,208,738 | 9/1965 | Johnson | 261/23 |
| 3,279,769 | 10/1966 | Zysk | 261/88 |
| 3,439,903 | 4/1969 | Tolnai | 261/44 |
| 3,548,792 | 12/1970 | Palmer et al. | 123/32 |
| 3,661,126 | 5/1972 | Baxendale | 123/32 |
| 3,704,702 | 12/1972 | Aono | 123/179 |
| 3,829,071 | 8/1974 | Valbona et al. | 261/89 |
| 3,920,778 | 11/1975 | De Rugeris | 261/39 |
| 3,960,118 | 6/1976 | Konomi et al. | 123/32 |
| 3,991,144 | 11/1976 | Diener | 261/88 |
| 4,036,186 | 7/1977 | Hattori et al. | 123/32 |
| 4,044,081 | 8/1977 | Weidlich | 261/51 |
| 4,055,609 | 10/1977 | Phelps | 261/36 |
| 4,057,604 | 11/1977 | Rollins | 261/88 |
| 4,106,453 | 8/1978 | Burley | 123/120 |
| 4,168,679 | 9/1979 | Ikeura et al. | 123/32 |
| 4,170,975 | 10/1979 | Wessel et al. | 261/88 |
| 4,187,264 | 2/1980 | Diener | 261/84 |
| 4,196,264 | 4/1980 | Troedsson et al. | 429/114 |
| 4,207,274 | 6/1980 | Phillips | 261/88 |
| 4,245,317 | 1/1981 | Marchak | 364/431 |
| 4,249,496 | 2/1981 | Shimazaki et al. | 123/438 |
| 4,274,141 | 6/1981 | Tukuda et al. | 364/431 |
| 4,283,358 | 8/1981 | Diener | 261/88 |
| 4,353,848 | 10/1982 | Carsten | 261/69 |
| 4,366,541 | 12/1982 | Mouri et al. | 364/431.05 |
| 4,368,705 | 1/1983 | Stevenson et al. | 123/357 |
| 4,369,149 | 1/1983 | Violett | 261/44 |
| 4,377,137 | 3/1983 | Amano et al. | 123/179 |
| 4,399,792 | 8/1983 | Otsuka et al. | 123/489 |
| 4,401,080 | 8/1983 | Otsuka et al. | 123/440 |
| 4,407,248 | 10/1983 | Takeuchi et al. | 123/439 |
| 4,411,234 | 10/1983 | Middleton | 123/485 |
| 4,413,601 | 11/1983 | Matsuoka et al. | 123/480 |
| 4,455,981 | 6/1984 | Suzuki et al. | 123/438 |
| 4,457,282 | 7/1984 | Muramatsu et al. | 123/486 |
| 4,463,731 | 8/1984 | Matsuoka | 123/492 |
| 4,474,712 | 10/1984 | Diener | 261/88 |
| 4,485,795 | 12/1984 | Lockard | 123/590 |
| 4,492,202 | 1/1985 | Muramatsu et al. | 123/478 |
| 4,495,921 | 1/1985 | Sawamoto | 123/438 |
| 4,495,927 | 1/1985 | Yamato | 123/491 |
| 4,496,286 | 1/1985 | Gagnon | 417/22 |
| 4,503,003 | 3/1985 | Gilbert | 261/51 |
| 4,512,319 | 4/1985 | Williams et al. | 123/492 |
| 4,522,766 | 6/1985 | Sunada | 261/91 |
| 4,543,937 | 10/1985 | Amano et al. | 123/491 |
| 4,546,748 | 10/1985 | Karino et al. | 123/494 |

CENTRAL INJECTION DEVICE FOR INTERNAL COMBUSTION ENGINES

Matter enclosed in heavy brackets [ ] appears in the original patent but forms no part of this reissue specification; matter printed in italics indicates the additions made by reissue.

*This application is a continuation of application Ser. No. 906,339, filed Sep. 11. 1986, now abandoned.*

BACKGROUND OF THE INVENTION

This invention relates to a central injection device for internal combustion engines, and more particularly to such a device having a rotor with an impeller driven by the intake air stream, the rotor being mounted in a housing for rotation about a fixed fuel feed stud connected to a fuel feed conduit and extending into a central borehole of the rotor but without contacting the wall of the borehole. The device further has a fuel outlet opening lying within the rotor, the rotor having a lateral fuel outlet opening connected to a connecting passage leading within the rotor to the fuel outlet opening of the fuel feed stud, a narrow annulus being provided between the fuel feed stud and the wall of the rotor borehole. The discharge orifice of the annulus, as well as the lateral fuel outlet opening, is located above a fuel level established when the rotor is at rest in the rotor borehole. With such arrangement the rotor is sealed as any leakage fuel, which is displaced radially by centrifugal forces from the outlet opening of the fuel feed stud located between the fuel level, is picked up by the annulus.

A central injection apparatus of the aforedescribed type is generally disclosed in German Pat. No. 25 36 996 entitled "Carburetor for Internal Combustion Engines". In all operating phases of the internal combustion engine, carburetors, or rather, central injection devices, of the above type generally deliver a quantity of atomized fuel into the intake manifold which is in direct proportion to the quantity of air drawn in and which produce an air-fuel mixture which is properly adjusted to ensure quantities of toxic substances in the exhaust which lie below the allowable limits.

However, it has been shown in these central injection devices that the quantity of toxic substances in the exhaust can reach peak values during operation, exceeding the allowable limits. These peak values are essentially attributable to a completely uncontrolled delivery of leakage fuel from the narrow annulus between the fuel feed stud and the rotor into the intake manifold. Moreover, the quantity of fuel which is delivered by the rotor of the central injection apparatus of known construction and which bears a linear relationship with the quantity of air drawn in over the entire operating range of the internal combustion engine, is considered unsatisfactory for internal combustion engines which need an air-fuel mixture enriched with fuel at the full load range.

SUMMARY OF THE INVENTION

A central injection device of the aforementioned type is arranged in accordance with the invention such that there is no uncontrolled delivery of leakage fuel from the annulus between the rotor and the fuel feed stud, and is capable of being used to enrich the air-fuel mixture with fuel at a higher load range without requiring additional parts.

In the rotor of the present device, a stowage compartment, whose periphery is defined by a concentric stowage ring and which is directly impinged upon by the intake air stream, is connected to the annulus, and an air overpressure is produced through the stowage compartment in the annulus which counteracts the leakage fuel pressure. In this annulus the air overpressure produced therein for all intake air stream velocities and, thus, for all rotational speeds of the impeller, is dependent upon the width of the opening of the stowage compartment directly impinged upon by the air stream and upon the geometry of the stowage ring defining its periphery so that, employing these parameters, an air overpressure can be established in the annulus which balances the leakage fuel pressure induced by centrifugal forces, or which is only slightly greater than the leakage fuel pressure. It is thus ensured that the fuel passage from the fixed fuel feed stud to the connecting passage leading to the fuel outlet opening in the rotor is always sealed with fuel against penetrating air, and that there is no uncontrolled outflow of leakage fuel from the discharge orifice of the annulus.

Advantageously, for establishing the air overpressure the stowage ring is provided with an inner wall which tapers conically in the direction of flow of the intake air stream. In rotor mounted to rotate in the housing by means of a ball bearing located at each rotor face, the stowage compartment can be connected with the discharge orifice of the annulus via the space between the inner and outer race of the ball bearing located upstream of the intake air stream.

To provide a more reliable sealing of the connecting passage against any incursion of air, an additional centrifugal seal may be provided formed by a suction pin provided at the bottom of the rotor borehole, in the surface of which there is an inlet opening for the connecting passage leading to the lateral fuel outlet opening, and a hollow cylindrical end piece of the fuel feed stud surrounding the suction pin without contacting same. Preferably, the end piece of the fuel feed stud is tapered, so that in a narrow annulus the inner end section has a correspondingly greater clearance space. With the thusly widened end section of the annulus, a substantially large supply of fuel is kept available for sealing. This greatly facilitates establishing and maintaining the proper air overpressure required for sealing.

In another advantageous feature of the invention, the lateral fuel outlet opening discharges into a concentric annulus extending along a midsection of the roter and is tightly sealed at the end located upstream of the intake air stream, the annulus being connected to the stowage compartment by at least one ventilating passage which opens into the interior of the annulus, the outer circumference of which being limited by a wall which extends conically in the direction of flow of the intake air stream. The annulus is open at the end located downstream, such as through a number of boreholes, toward a concentric spray ring which extends in the direction of flow of the intake air. The fuel, which is delivered into the annulus through the fuel outlet openings when the rotor is turning, flows downstream as a thin film on the conical wall of the annulus and through the boreholes to the spray ring, and from the spraying edge thereof it is atomized into a mist consisting of fine droplets, during which period air is also introduced from the stowage compartment into the annulus through the ventilating passage. By such a venting of the annulus, an even and unimpeded outflow of the fuel delivered through the fuel outlet opening to the spray ring is ensured at all rotor speeds, thereby precluding the occurrence of concentration peaks of toxic substances resulting from an uneven fuel flow.

*When the rotor is at rest, an internal fuel level is established therein. During ingested air-driven rotation of the rotor, fuel is sequentially flowed through the fuel feed stud downwardly across the at-rest fuel level, laterally through the rotor, upwardly through the rotor across the fuel level, and then outwardly through the lateral fuel outlet opening into the concentric annulus. As previously described, the fuel then flows downwardly through the annulus and across the fuel level to the spray ring which is disposed downstream from the bladed portion of the rotor.*

The spray ring can be offset radially outwardly from the conical wall of the annulus and may have an inner wall which tapers conically in the direction of flow of the intake air, so that some fuel can accumulate within the spray ring when the rotor is turning. The formation of such a fuel supply, even though small, promotes a steady operation of the internal combustion engine and is especially advantageous when there are abrupt changes from high to low rotor speeds.

The central injection device in accordance with the present invention can be used to enrich an air-fuel mixture with fuel during a higher load range of the internal combustion engine. Such use is distinguished, according to the invention, by the fact that by adapting the width of the opening of the stowage compartment, which is exposed to the intake air stream, to the velocity of flow of the air drawn in at the higher load range, an air pressure is produced in the annulus which counteracts the leakage fuel pressure in the annulus, which air pressure is smaller than the leakage fuel at the higher load range and which allows a controlled outflow of leakage fuel from the annulus. The leakage fuel flowing out of the annulus reaches the stowage compartment and is atomized either by means of the stowage ring or, when an annulus is connected to the stowage compartment by ventilating passages, through the ventilating passages and through the annulus to the spray ring, by which it is atomized. The appropriate width of opening of the stowage compartment can be determined experimentally without difficulty, during which material is removed, preferably from the inside wall of the stowage ring, until the exhaust has the desired CO values. In this manner, it is possible to establish in the exhaust, as desired, a CO content from 0.1 volume percent on upwards.

DETAILED DESCRIPTION OF THE INVENTION

Figure 1:
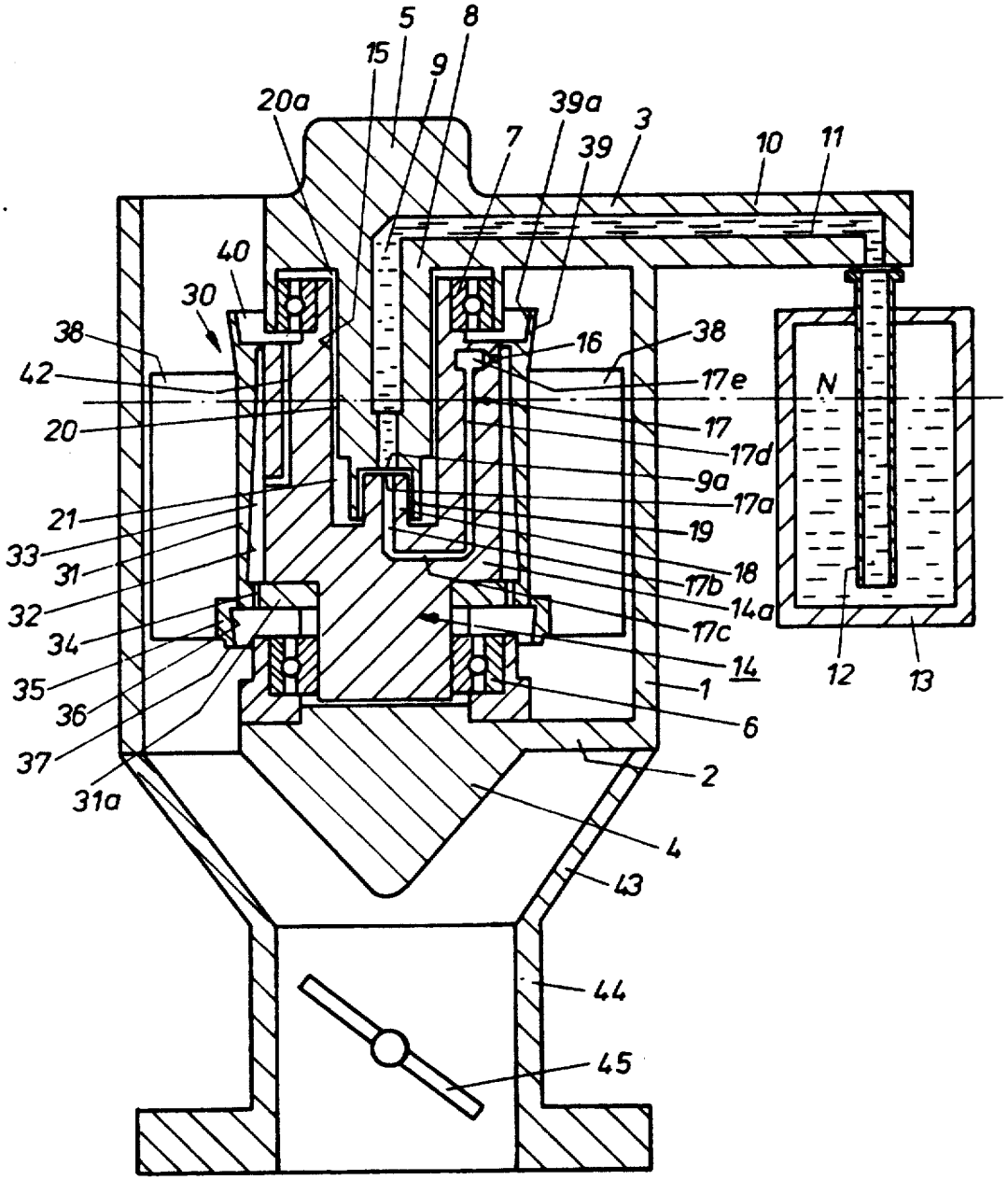
FIG. 1 is a longitudinal sectional view of the central injection device according to the invention.
Figure 2:
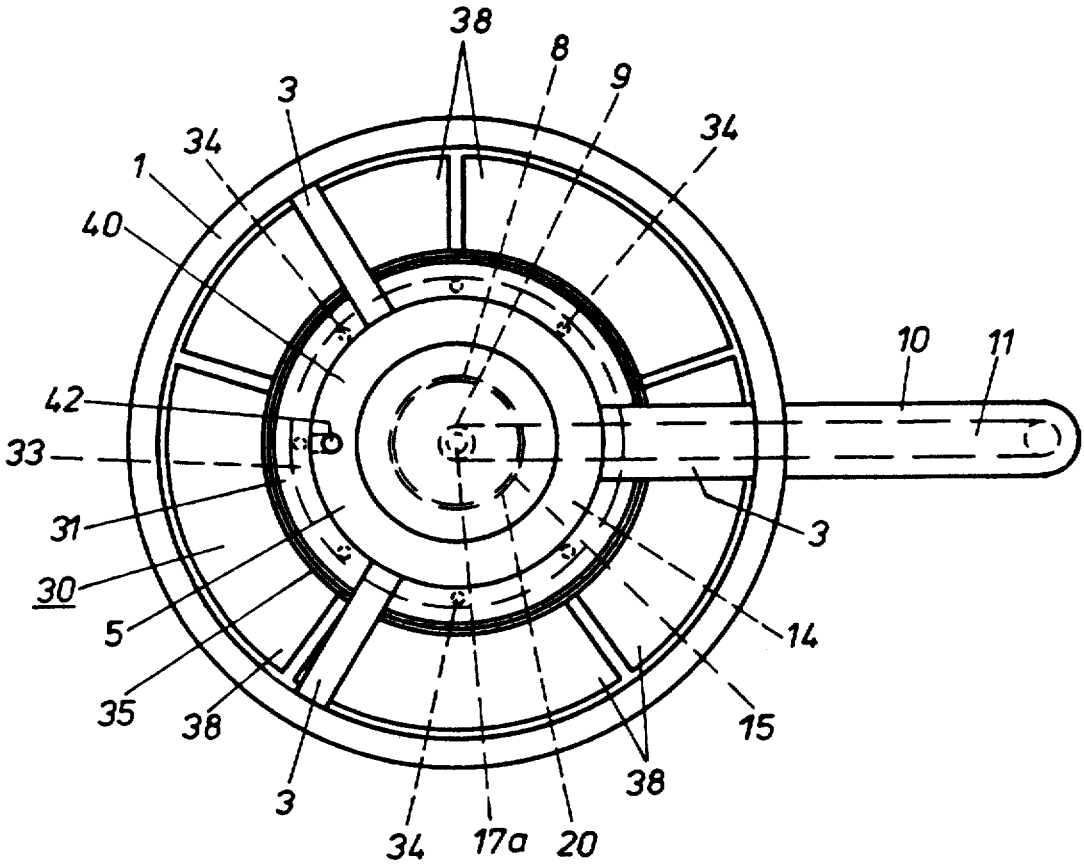
FIG. 2 is a top plan view of the central injection device of FIG. 1.

The central injection device disclosed in the drawings comprises a hollow cylindrical housing 1 having at the opposed ends thereof radial struts 2 and 3 on which central supporting structures 4 and 5 are respectively mounted. The outer races of ball bearings 6 and 7 are mounted on structures 4 and 5. A central fuel feed stud 8, having a coaxial feed borehole 9, is connected to an intake pipe 12 which extends into a float chamber 13. Stud 8 extends from the upper bearing support 5 and has a feed passage 11 projecting radially outwardly from one of struts 3, the passage having an outer radial shoulder 10. A rotor 14, which has a central borehole 15 for receiving the fuel feed stud 8 without making contact therewith, is attached at opposite ends to the inner races of the ball bearings 6, 7 and rotates about the central axis of the fuel feed stud 8. At the upper end of the cylindrical mid-section 14a of the rotor there is provided a lateral fuel outlet opening 16 in the form of an orifice or an aperture and to which is connected within the rotor a connecting passage 17 leading to an outlet opening 9a of the feed bore 9 in the fuel feed stud 8.

An inlet opening 17a of the connecting passage 17 is located on the face of a cylindrical intake pin 18 which projects upwardly from the bottom of a rotor bore 15, and the connecting passage 17 is comprised of an initial section 17b coaxial with the axis of rotation and extending downwardly from the inlet opening 17a, a mid-section 17d being connected thereto by a radial section 17c and lying preferably parallel to the axis of rotation, and the radial final section 17e with a lateral fuel outlet opening 16 being disposed higher than the inlet opening 17a of the connecting passage 17. A fuel level N is set by the float to a level which, with the rotor at rest, lies between the outlet opening 16 and the inlet opening 17a.

The intake pin 18 comprises one part of a "centrifugal seal", the other part of which comprises a hollow cylindrical end piece 19 of the fuel feed stud 8 surrounding the intake pin 18 without being in contact therewith. The end piece 19 has an outer diameter slightly less than the fuel feed stud 8, so that a narrow annulus 20 between the outer wall of the fuel feed stud 8 and the wall of the rotor borehole 15 has an enlarged inner end portion 21 surrounding the hollow cylindrical end piece 9, the inner end portion 21 being connected to the outlet opening 9a of the feed borehole 9 in the fuel feed stud 8 and to the inlet opening 17a of the connecting passage 17 via the space between the intake pin 18 and the hollow cylindrical end piece 19.

An impeller 30 is attached to the rotor 14 by a shell 31, with the wall 32 of the shell, which flares conically downwardly, defining an annulus 33 extending along the mid-portion 14a of the rotor as outer periphery. The lateral fuel outlet opening 16 of the rotor 14 opens into the annulus 33 near its upper closed end. The annulus 33 is opened downwardly at its bottom end by a number of holes 34, for example, eight, in the inner flange 31a of the impeller shell 31, which holes are substantially parallel to the axis of rotation. Below the inner flange 31a the impeller shell 31 is constructed as a spray ring 35 which preferably has a conical inwardly tapering inner wall 36 and a spray ring 37 located below the blades 38 of the impeller 30.

The upper end of the impeller shell 31 has a concentric stowage ring 39 having a diameter greater than the outer diameter of the upper supporting structure 5 and which forms the circumferential wall for an annular stowage compartment 40 for the intake air. The stowage compartment is open at the top. The stowage ring 39 preferably has an inner wall 39a which flares conically upwardly and has an edge lying above the blades 38.

The upper ball bearing 7 is positioned it such manner that it has clearance both from the inner face of the supporting structure 5 and from the bottom of the stowage compartment 40, so that the latter is connected to the discharge orifice 20a of the narrow annulus 20 via the opening between the inner and outer races of the ball bearing 7 and the space between the ball bearing 7 and the face of the supporting structure.

The rotor mid-section 14a also has at least one ventilating passage 42 leading from the bottom of the stowage compartment 40 into the annulus 33 and opening thereinto approximately at its midpoint.

The hollow cylindrical housing 1 of the central injection apparatus is a part of the intake pipe and is connected, by means of a conical spacer 43, with a section 44 of an intake pipe containing the throttle valve 45.

As mentioned above, the fuel level N is set to lie between the level of the inlet opening 17a of the connecting passage 17 and the level of the fuel outlet opening 16 when the rotor is at rest, and since the discharge orifice 20a still lies above the fuel outlet opening 16, no fuel can flow out of the rotor. The rotor borehole 15 is filled with fuel in the transition area from the fuel feed stud 8 to the inlet opening 17a.

During operation, the air drawn in by the internal combustion engine drives the impeller which, in turn, drives the rotor, during which the rotational speed of the rotor bears a linear relationship to the flow velocity and, thus, to the quantity of intake air.

The fuel is delivered through the connecting passage 17 to the fuel outlet opening 16 by the effective centrifugal acceleration, the fuel being accumulated in the radial end section 17e of the connecting passage and being applied at the fuel outlet opening 16 with a pressure which varies in proportion to the square of the rotational speed. The fuel which is discharged from the fuel outlet opening 16 into the annulus 33 flows downwardly along its conical wall 32 and through the holes 34 to the spray ring 35, whose atomizing edge 37 disperses it as a fine fog. Since the quantity of fuel delivered from the fuel outlet opening 16 bears a linear relationship to the quantity of intake air, a constant air ratio results for the air-fuel mixture during all operating phases of the internal combustion engine. Due to the conical inner wall 36 of the spray ring 35 tapering inwardly toward the spray edge 37, a small supply of fuel accumulates inside the spray ring at higher RPM's. Owing to the runoff of the small quantity of fuel, the run of the internal combustion engine is evened out when suddenly passing from high to low RPM's.

When the rotor turns, centrifugal forces also act on the fuel present in the rotor bore 15, so that a fuel pressure develops in the narrow annulus 20, which varies in proportion to the square of the rotational speed. This pressure is relatively small because of the small radius of the rotor bore 15 in relation to the distance of the fuel outlet opening 16 from the axis of rotation. However, at higher RPM's it is sufficient to allow fuel to flow out of the annulus. Leakage fuel is prevented by the air overpressure produced, according to the invention, in the annulus 20 via the stowage compartment 40 and counteracting the leakage fuel pressure. It has been shown that solely by appropriately constructing the stowage ring 30 and by dimensioning the opening of the stowage compartment directly exposed to the intake air stream which, in the embodiment shown, is determined by the inside diameter of the stowage ring 39 and by the outside diameter of the upper supporting structure 5 containing the ball bearing 7, can an air pressure be obtained in the annulus 20 which balances the leakage fuel pressure over the entire speed range of the rotor, so that no leakage fuel can flow out. The fuel supply contained in the broadened inner end section 21 of the annulus 20 maintains at all rotational speeds the space between the intake pin 18 rotating with the rotor and the end piece 19 of the fixed fuel feed stud 8 filled with fuel, so that even with a slightly higher air pressure in the annulus relative to the leakage fuel pressure no air can enter the connecting passage 17 and each the fuel outlet opening 16 therethrough.

As mentioned earlier, to obtain the desired enriching of the air-fuel mixture in the higher load range of the internal combustion machine, an opening width of the stowage compartment 40 is determined experimentally from the ratio of the diameters of the stowage ring 39 to the ball bearing support or to the supporting structure 5 where the air pressure in the annulus 20 is slightly larger than the leakage fuel pressure in the lower load range, but is slightly lower than the leakage fuel pressure in the higher load range, so that more leakage fuel is discharged from the annulus 20 for enrichment. The changeover from a slightly higher to a lower air pressure in the annulus occurs in a sufficiently well-defined small speed range and results in a controlled delivery of leakage fuel.

The results that can actually be obtained with a central injection apparatus according to the invention are shown by the following numerical representation relating to an injection apparatus of the construction shown in the drawing:

| | |
|---|---|
| Diameter of rotor bore 15 | 3.5 mm |
| Diameter of fuel feed stud 8 | 3.4 mm |
| Outside diameter of end piece 19 | 2.5 mm |
| Diameter of feed bore 9 tapered to 1.4 | 1.8 mm |
| Connecting passage 17 | |
| Initial section 17b diameter | 1.1 mm |
| Central section 17d diameter | 1.1 mm |
| End section 17e diameter | 2.0 mm |
| Fuel outlet opening diameter | 0.5 mm |
| Intake pin 18, outside diam. | 1.75 mm |
| Inside diameter of end piece 19 | 1.9 mm |
| Annulus 33: outer wall 32, 1.5 conical taper | |
| Bores 34: 8 each with a diameter of | 0.8 mm |
| Ventilating passage 42, diameter | 2.0 mm |
| Stowage ring 39 inside diameter | 22.0 mm |
| Supporting structure, outside diameter at the ball bearing support | 20.5 mm |

The clearance space between impeller and housing was dimensioned such as to result in the following rotor speeds in a motor vehicle engine:

| | Engine speed | Rotor speed |
|---|---|---|
| Idle run | 900 RPM | 1800 RPM |
| ¼ load | 2500 RPM | 6700 RPM |
| ½ load | 3500 | 13500 RPM |
| ¾ load | 4500 | 20200 RPM |
| Full load | 5500 | 27000 RPM |

Fuel pressure at the fuel outlet opening 16:
at full load approximately $43.4 \times 10^4$Pa
at idle approximately $0.2 \times 10^4$Pa

| Pressure in annulus 20 | Fuel pressure | Air pressure |
|---|---|---|
| at ¾ load, (rotor at 20,200 RPM) | $4.22 \times 10^4$Pa | slightly larger |
| at full load, (rotor at 27,000 RPM) | $7.46 \times 10^4$Pa | $6.87 \times 10^4$Pa |

Thus, the desired enrichment of the mixture at full load was ensured.

A Eurotest in accordance with Regulation EC No. 15/03 (Biel, May 25, 1982) yielded the following results (for a reference weight of 1,050 kg):

| Allowable limits | With central injection according to the invention: I | II |
|---|---|---|
| Type I | | |
| CO: 87 g | CO: 24.28 g | CO: 35.89 g |
| CH: 7.1 g | CH: 2.32 g | CH: 2.11 g |
| NOX: 10.2 g | NOX: 5.11 g | NOX: 5.26 g |
| Type II | | |
| 3.5 vol. % | CO: 0.1 vol. % | CO: 0.3 vol. % |

wherein the central injection apparatus was adjusted via the stowage ring 39 so that it yielded 0.1 volume percent carbon monoxide for (I) and 0.3 volume percent for (II).

What is claimed is:

1. In a central injection device for an internal combustion engine having a rotor with an impeller driven by the intake air stream, said rotor being mounted in a housing for rotation about a fixed fuel feed stud connected to a fuel feed conduit and extending into a central borehole of the rotor without contacting same and having a fuel outlet opening lying within the rotor, said rotor having a lateral fuel outlet opening connected to a connecting passage leading within the rotor to the fuel outlet opening of the fuel feed stud, a narrow annulus being provided between the fuel feed stud and the wall of the rotor borehole, the discharge orifice of said annulus, as wall as the lateral fuel outlet opening, lying above a fuel level established when the rotor is at rest, which annulus, in order to seal the rotor, picks up the leakage fuel which is displaced radially by centrifugal forces from the outlet opening of the fuel feed stud lying below the fuel level, the improvement wherein a stowage compartment (40) bounded peripherally by a concentric stowage ring (39) and impacted upon directly by the intake air stream, is connected to the annulus (20), the stowage ring (39) having an inner wall which tapers conically in the direction of the intake air stream, and wherein an air overpressure, which counteracts the leakage fuel pressure, is produced over the stowage compartment (40) in the annulus (20).

2. The device according to claim 1 further having upper and lower ball bearings (6, 7) located at opposite end faces of said rotor (14), the rotor rotating in the housing (1) by means of the ball bearings (6, 7), the improvement wherein the stowage compartment (40) is connected to the discharge orifice (20a) of the annulus (20) via the space between the inner and the outer race of the upper ball bearing (7) which is located upstream of the intake air stream.

3. In a central injection device for an internal combustion engine having a rotor with an impeller driven by the intake air stream, said rotor being mounted in a housing for rotation about a fixed fuel feed stud connected to a fuel feed conduit and extending into a central borehole of the rotor without contacting same and having a fuel outlet opening lying within the rotor, said rotor having a lateral fuel outlet opening connected to a connecting passage leading within the rotor to the fuel outlet opening of the fuel feed stud, a narrow annulus being provided between the fuel stud and the wall of the rotor borehole, the discharge orifice of said annulus, as well as the lateral fuel outlet opening, lying above a fuel level established when the rotor is at rest, which annulus, in order to seal the rotor, picks up the leakage fuel which is displaced radially by centrifugal forces from the outlet opening of the fuel feed stud lying below the fuel level, the improvement wherein a stowage compartment (40) bounded peripherally by a concentric stowage ring (39) and impacted upon directly by the intake air stream, is connected to the annulus (20), a cylindrical suction pin (18) being provided at the bottom of the rotor borehole (15) in the face of which is disposed an inlet opening (17a) of the connecting passage (17) leading to the lateral fuel outlet (16), the fuel feed stud (8) having a hollow cylindrical endpiece (19) which surrounds the suction pin (18) without contacting same and forms a centrifugal seal therewith, and wherein an air overpressure, which counteracts the leakage fuel pressure, is produced over the stowage compartment (40) in the annulus (20).

4. The device according to claim [38] *3*, the improvement wherein the fuel feed stud (8) has a depending endpiece (19) defining a large inner end segment (21) of the annulus (20).

5. In a central injection device for an internal combustion engine having a rotor with an impeller driven by the intake air stream, said rotor being mounted in a housing for rotation about a fixed fuel feed stud connected to a fuel feed conduit and extending into a central borehole of the rotor without contacting same and having a fuel outlet opening lying within the rotor, said rotor having a lateral fuel outlet opening connected to a connecting passage leading within the rotor to the fuel outlet opening of the fuel feed stud, a narrow annulus being provided between the fuel feed stud and the wall of the rotor borehole, the discharge orifice of said annulus, as well as the lateral fuel outlet opening, lying above a fuel level established when the rotor is at rest, which annulus, in order to seal the rotor, picks up the leakage fuel which is displaced radially by centrifugal forces from the outlet opening of the fuel feed stud lying below the fuel level, the improvement wherein a stowage compartment (40) bounded peripherally by a concentric stowage ring (39) and impacted upon directly by the intake air stream, is connected to the annulus (20), the lateral fuel outlet opening discharging into a concentric annulus (33) which extends along the length of a mid section (14a) of the rotor, said concentric annulus being sealed shut at its end which lies upstream of the intake air stream and is connected with the stowage compartment (40) by at least one ventilating passage (42) opening into the inside of the annulus (40), said annulus (33) being bounded along its outer periphery by a wall (32) which extends conically in the direction of flow of the intake air and being open at its downstream end via a number of holes (34) toward a concentric spray ring (35) which extends in the direction of flow of the intake air, and wherein an air overpressure, which counteracts the leakage fuel pressure, is produced over the stowage compartment (40) in the annulus (20).

6. The device according to claim 5, the improvement wherein the spray ring (35) is offset radially outwardly relative to the conical wall (32) of the annulus (33) and has an inner wall (36) which tapers conically in the direction of flow of the intake air.

*7. A central injection device for an internal combustion engine, comprising:*

*(a) a hollow, generally cylindrical housing having an axis and adapted to receive and discharge a flow of ingested air;*

(b) a rotor having a circumferential array of blades coaxially disposed thereon, and having an upper end and a lower end;

(c) means for coaxially supporting said rotor within said housing for rotation about said axis in response to ingested air flow through said housing;

(d) passage means, formed in said rotor, for defining a pump therein adapted to receive fuel from a source thereof and centrifugally discharge the received fuel from said rotor, said passage means having a fuel level established when said rotor is at rest and including:

(1) a centrally disposed axial passage having a lower end positioned below said fuel level, (2) a first laterally extending passage extending outwardly from said lower end of said first axially extending passage, (3) a second axial passage extending upwardly from the outer end of said first laterally extending passage to a point above said fuel level, (4) an annular fuel discharge passage circumscribing said first and second axial passages and extending axially from above said fuel level to below said first laterally extending passage, said annular passage having a fuel discharge opening disposed on a lower end portion thereof, and (5) a second laterally extending passage having an orifice operably disposed therein and intercommunicating said second axial passage and said annular fuel discharge passage at a location positioned above said fuel level; and (e) a spray ring coaxially carried by said rotor, said spray ring having a spray edge portion disposed below said rotor blades and positioned to intercept, and form a fuel mist from, fuel discharged through said fuel discharge opening.

8. A method of creating a fuel mist discharge from the spinning, bladed rotor of a central injection device for an internal combustion engine, said rotor having an upper end portion, a lower end portion, a fuel outlet opening, and an internal fuel level established when said rotor is at rest, said method comprising the steps of:

(a) sequentially flowing fuel downwardly through the rotor and across said fuel level, laterally outwardly through the rotor, upwardly through the rotor and across said fuel level, laterally outwardly through said rotor across metering orifice means therein, downwardly through said rotor and across said fuel level, and outwardly through said fuel outlet opening;

(b) positioning an edge of an atomizing member downstream from the rotor blades; and (c) flowing fuel discharged from said fuel outlet opening across said edge.

9. A central injection device for an internal combustion engine, comprising:

(a) a hollow housing;

(b) a rotor having a bladed impeller thereon and being mounted in said housing for rotation in response to an air flow through said housing;

(c) passage means in said rotor for receiving fuel from a source thereof and discharging the received fuel in response to rotation of said rotor, said passage means having a fuel level established by fuel in said rotor when said rotor is at rest, said passage means further having:

an upstream section for flowing fuel downwardly across said fuel level, an intermediate section for receiving fuel from said upstream section below said fuel level and flowing the received fuel upwardly across said fuel level to a downstream end portion of said intermediate section disposed above said fuel level, and a downstream section communicating with said downstream portion of said intermediate section and extending downwardly therefrom to a level below said fuel level and the impeller blades;

(d) orifice means, disposed in said downstream end portion of said intermediate section of said passage means above said fuel level, for metering fuel flow through said passage means; and (e) spray edge means, positioned downstream from the impeller blades, for intercepting fuel discharged from said downstream section of said passage means and converting the fuel to a fine mist.

10. The device of claim 9 wherein said downstream section of said passage means comprises an annular fuel discharge passage communicating with the balance of said passage means through said orifice means.

11. The device of claim 10 wherein said annular fuel discharge passage is vented to the exterior of said rotor.

12. The device of claim 10 wherein said fuel discharge passage has a conically downwardly flared laterally outer periphery.

13. The device of claim 9 wherein:

said rotor has a central axial bore extending inwardly through an upper end thereof, said device further comprises a fuel feed stud extending downwardly through said bore without contacting the surface thereof, said fuel feed stud having an internal fuel passage opening downwardly through a lower end surface thereof and defining said upstream section of said passage means, said intermediate section of said passage means has an axially extending inlet portion having an inlet facing and spaced downwardly from the outlet of said fuel feed stud fuel passage, and said device further comprises means defining a centrifugal seal circumscribing a portion of said axially extending inlet portion of said intermediate section of said passage means adjacent the outlet of said internal fuel passage of said fuel feed stud.

14. The device of claim 13 wherein:

said rotor has a hollow cylindrical central intake pin extending axially upwardly into said axial bore of said rotor and internally defining an upper portion of said axially extending inlet portion of said intermediate section of said passage means, said fuel feed stud has a hollow cylindrical lower end portion circumscribing said intake pin without contacting it, and said centrifugal seal-defining means include said hollow cylindrical central intake pin and said hollow cylindrical lower end portion of said fuel feed stud.

15. The device of claim 9 further comprising an atomizing ring coaxially carried by said rotor adjacent a lower end portion thereof and having a lower end defining said spray edge means.

16. The device of claim 15 wherein said atomizing ring has a conically downwardly tapered inner surface.

17. The device of claim 9 further comprising:

upper and lower central support means respectively carried by upper and lower portions of said housing, upper and lower bearing means respectively carried by said upper and lower central support means and rotatably supporting upper and lower end portions of said rotor,

*a central axial bore extending downwardly through said upper end portion of said rotor, and*

*a fuel feed stud extending downwardly into said bore and defining therein an annular passage, said annular passage communicating with an upper end of said upper bearing means.*

*18. The device of claim 17 further comprising stowage compartment means for intercepting air flowing through said housing, and utilizing the pressure of the intercepted air to impede fuel flow outwardly through said upper bearing means from said annular passage around said fuel feed stud.*

*19. The device of claim 18 wherein said passage means include an annular fuel discharge passage, and wherein said device further comprises a vent passage extending between said annular fuel discharge passage and said stowage compartment means.*

*20. The device of claim 18 wherein said stowage compartment means are defined by a conically upwardly flared annular upper end portion of said rotor which circumcribes and is spaced laterally outwardly from a lower end portion of said upper bearing means.*

* * * * *